United States Patent
Dai et al.

(10) Patent No.: US 7,472,119 B2
(45) Date of Patent: Dec. 30, 2008

(54) PRIORITIZING SEARCH RESULTS BY CLIENT SEARCH SATISFACTION

(75) Inventors: James Dai, Redmond, WA (US); Ramez Naam, Seattle, WA (US); Saleel Sathe, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 366 days.

(21) Appl. No.: 11/171,773

(22) Filed: Jun. 30, 2005

(65) Prior Publication Data

US 2007/0005575 A1 Jan. 4, 2007

(51) Int. Cl.
G06F 7/06 (2006.01)
G06F 7/10 (2006.01)
G06F 7/22 (2006.01)

(52) U.S. Cl. .............. 707/5; 707/2; 707/104.1
(58) Field of Classification Search .............. 707/2, 707/5, 104.1
See application file for complete search history.

(56) References Cited

U.S. PATENT DOCUMENTS

| | | | |
|---|---|---|---|
| 6,539,377 B1 * | 3/2003 | Culliss | 707/5 |
| 6,714,929 B1 | 3/2004 | Micaelian et al. | |
| 6,810,395 B1 | 10/2004 | Bharat | |
| 6,944,609 B2 | 9/2005 | Witbrock | |
| 7,003,513 B2 | 2/2006 | Geiselhart | |
| 7,010,527 B2 | 3/2006 | Alpha | |
| 2004/0199419 A1 | 10/2004 | Kim et al. | |
| 2005/0060311 A1 * | 3/2005 | Tong et al. | 707/7 |
| 2005/0071328 A1 * | 3/2005 | Lawrence | 707/3 |
| 2005/0234904 A1 | 10/2005 | Brill et al. | |
| 2005/0245241 A1 * | 11/2005 | Durand et al. | 455/414.1 |
| 2005/0256848 A1 * | 11/2005 | Alpert et al. | 707/3 |
| 2006/0224587 A1 * | 10/2006 | Zamir et al. | 707/7 |
| 2007/0112761 A1 * | 5/2007 | Xu et al. | 707/5 |

* cited by examiner

*Primary Examiner*—Kuen S Lu
*Assistant Examiner*—Patrick E Sweeney
(74) *Attorney, Agent, or Firm*—Senniger Powers LLP (57) ABSTRACT

A method prioritizes search results provided to a client according to client satisfaction with previous search results. The method tracks client activity with respect to the previous search results, determines individual client satisfaction for each item according to the tracked client activity, and provides one or more of the items determined to have a high client satisfaction. A user interface provides prioritized search results to a client according to client satisfaction with a previous search similar to the current search. The user interface comprises an item display of at least one item determined to have a high client satisfaction level and at least one item not determined to have a high client satisfaction level.

20 Claims, 5 Drawing Sheets

MSN Home | My MSN | Hotmail | Shopping | Money | People & Chat          61 msnSearch   beta     63          Home | Advanced Search | My Preferences | Help

[Valentine's day]   [Search]

Results 1-15 of about 903748 containing "valentine's day"                    NEXT >>

SPONSORED SITES
1-800-FLOWERS.COM – WWW.1800flowers.COM
Send Valentine's day flowers and gifts. Same-day delivery available. Order online fast and easy.
Romantic Songs Custom Piano CD $47.50 – www.pianomusic4you.com
Perfect Valentine's gift. Wonderful romantic love songs recorded on custom piano CD. You choose your top love songs, Van Day...

Everything you've clicked on for "valentine's day" - back to search results
Sorted by Favorites     Sort by when I clicked    65      91
Your Favorites:          87              89                 99

Kids Domain – Valentines Day        (delete)  saved ✪
Valentines Day Happy Valentines Day! You'll find crafts, games, cards and more to celebrate with. Valentines Day is on February 14th. Send/Get an eCard Free Graphics History Party Activities...
www.kidsdomain.com/holiday/val – clicked 4 days ago 95
Pages We Think You Liked:
Happy Valentines day!               (delete) (save ☆)
Free valentine's day celebrations. Valentine poems, cards, history, recipe, crafts, and many more... Valentine's Day is a day to express your love, and to celebrate the spirit of love...
theholidayspat.com/valentine – clicked 15 days ago
                                                    85
Other Pages You clicked On:
Valentine's Day – Not Like it Used to Be – History and Customs                (delete) (save ☆)
Valentine's Day isn't what it used to be – and it's a good thing it's not! Read about the history and traditions of this lover's holiday.... February 14 is Valentine's Day. Although it is celebrated as a lovers' holiday today, with the giving of candy, flowers, ...
Wilstar.net/holidays/valentn.htm – clicked 1 hour ago THE ST. VALENTINE'S DAY MASSACRE   (delete) (save ☆)
- HAUNTED CHICAGO - VALENTINE'S DAY MASSACRE 2122 NORTH CLARK STREET "Only Capone kills guys like that!", said Bugs Moran (above) after learning that seven of his men had been killed in a ...
www.praireghosts.com/valentine.html – clicked 2 days ago
                                                    97
Other things you've searched for before and after "valentine's day"
Seattle flowers✪ enagement rings   valentine's poetry   capitol hill flower delivery
Privacy options              93              101
▶ clear history for "valentine's day"  ▶ stop recording my history RECENT SEARCHES
Seattle flowers                 ✪
Chocolate candy                 ☆
History of holidays             ☆
Massage gift certificate        ☆
More...              favorites...

RECENT PAGES
Seattle post-intelligencer:
Northwest Gardens               ✪
http://seattlepi.nwsource.com/
Send Flowers- Seattle           ☆
Flowers Sent Anywhere
http://www.locateaflowershop...
Making Chocolate Candy          ☆
http://ny.essortment.com/
...
more...              save...

PRIORITIZING SEARCH RESULTS BY CLIENT SEARCH SATISFACTION

BACKGROUND

Clients utilizing computing devices often face a daunting task when searching for information stored on the computing device itself, information available over the internet, or information stored within any other data repository. As more data sources become available, search queries may become more refined to provide focused, helpful results. Clients frequently engage in search sessions requiring multiple queries to further refine a previous search that yielded inadequate results. After submitting several queries, reviewing a number of items, and finding the correct information, however, most clients do not make an effort to save the location of the item for future reference and do not use application tools (e.g., browser favorites) or other features to make it easy to return to the location of the item.

Thus, referring to previous search results in an effort to build upon previous searching sessions is a seldom used, but useful, tool. Conventionally, recreating previous search results can be difficult and often requires issuing multiple trial search queries, reviewing multiple potential items of interest, and possibly selecting many potential items before finding the one or small number of satisfactory items located during the previous search session. Retrieving those previous search results is often difficult because no organized system presents the client with a coherent picture of which items were previously selected by the client, which items were previously helpful to the client, what other search queries the client used to refine the initial query, and any explicit client feedback relating to the previous search results. Simply recording client item selections, without some indication of what items selected were helpful to the client and what items selected were not helpful, fails to provide adequate guidance. Without additional information, recreating a previous search requires much trial and error on behalf of the client.

SUMMARY

The following simplified summary provides a basic overview of some aspects of the present technology. This summary is not an extensive overview. It is not intended to identify key or critical elements or to delineate the scope of this technology. This summary is not intended to be used as an aid in determining the scope of the claimed subject matter. Its purpose is to present some simplified concepts related to the technology before the more detailed description presented below.

Accordingly, a method for tracking previous search sessions and providing search results according to client satisfaction with previous results is utilized for providing more accurate search results to the client in the future. Information related to previous searching is tracked and saved in order to determine what items located in the previous search were most likely to be sought after by the client in the present search. This information is utilized to provide a better search result to the client. A user interface provides prioritized search results according to client satisfaction with the results of a previous search. The user interface displays items according to their determined client satisfaction level and indicates to the client that such items are likely desirable choices for the client.

BRIEF DESCRIPTION OF THE DRAWINGS

Corresponding reference characters indicate corresponding parts throughout the drawings.

DETAILED DESCRIPTION

Systems for Prioritizing Search Results

Figure 1:
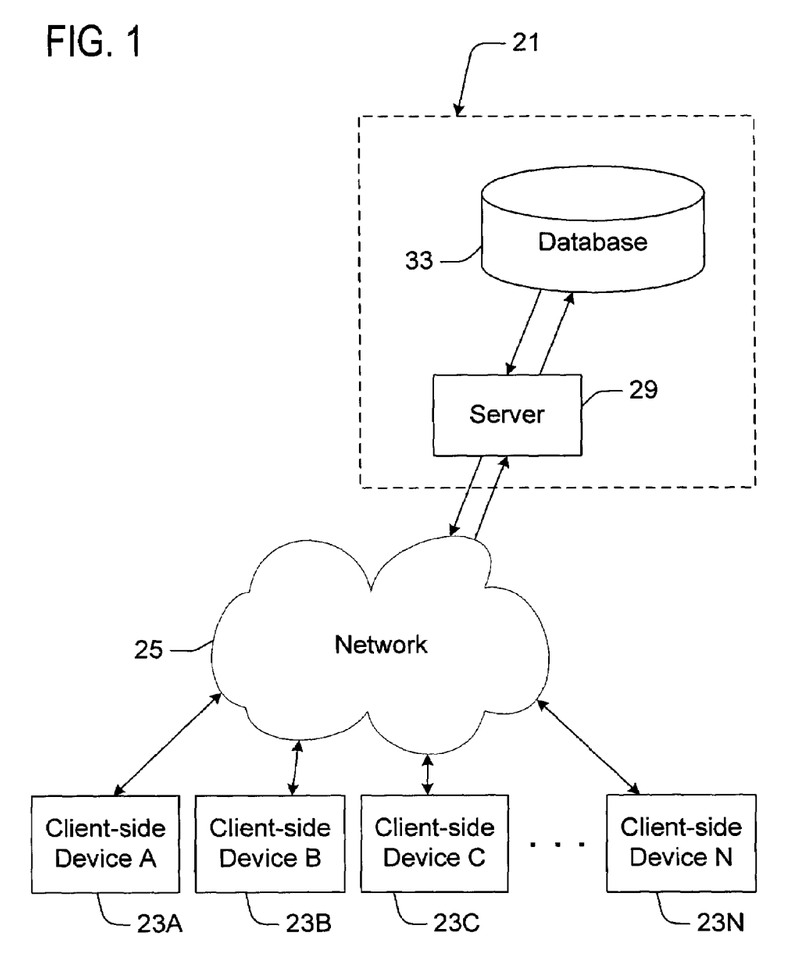
FIG. 1 is a diagram of an exemplary system of the present invention.

Referring now to FIG. 1, a system, generally indicated 21, for prioritizing search results provided to a client-side device 23 by a search engine via a network 25 according to client satisfaction with previous search results provided to the client is disclosed. The system 21 is introduced generally here, as its components will be utilized throughout the following discussion to describe the methods and user interfaces disclosed herein. For example, the system 21 comprises a server 29 adapted for connection with the network 25. The server 29 is adapted for receiving search queries from the client accessing the network 25 with one or more of the client-side devices 23A-N. The system 21 may also comprise a database 33 adapted for connection with the server 29 for storing the received search queries provided by the client. The database 33 may also be adapted for storing a search result provided to the client by the server 29 in response to the search query. The search result may comprise items of various interest to the client such as a listing of files or internet links, among others.

The server 29 may be further configured to track client activity with respect to the provided items of the search result and store the client activity on the database 33. The server 29 may also determine an individual client satisfaction level for each of the items according to the tracked client activity. The server 29 may store the individual client satisfaction levels of the items on the database 33. The server 29 may also receive a second search query from the same client similar to the stored search query and provide a selection element to the client for selecting one or more of the items determined to have a high client satisfaction level. As would be understood by one skilled in the art, such a system may be implemented in any number of ways without departing from the scope of the present invention.

Methods for Prioritizing Search Results

Figure 2:
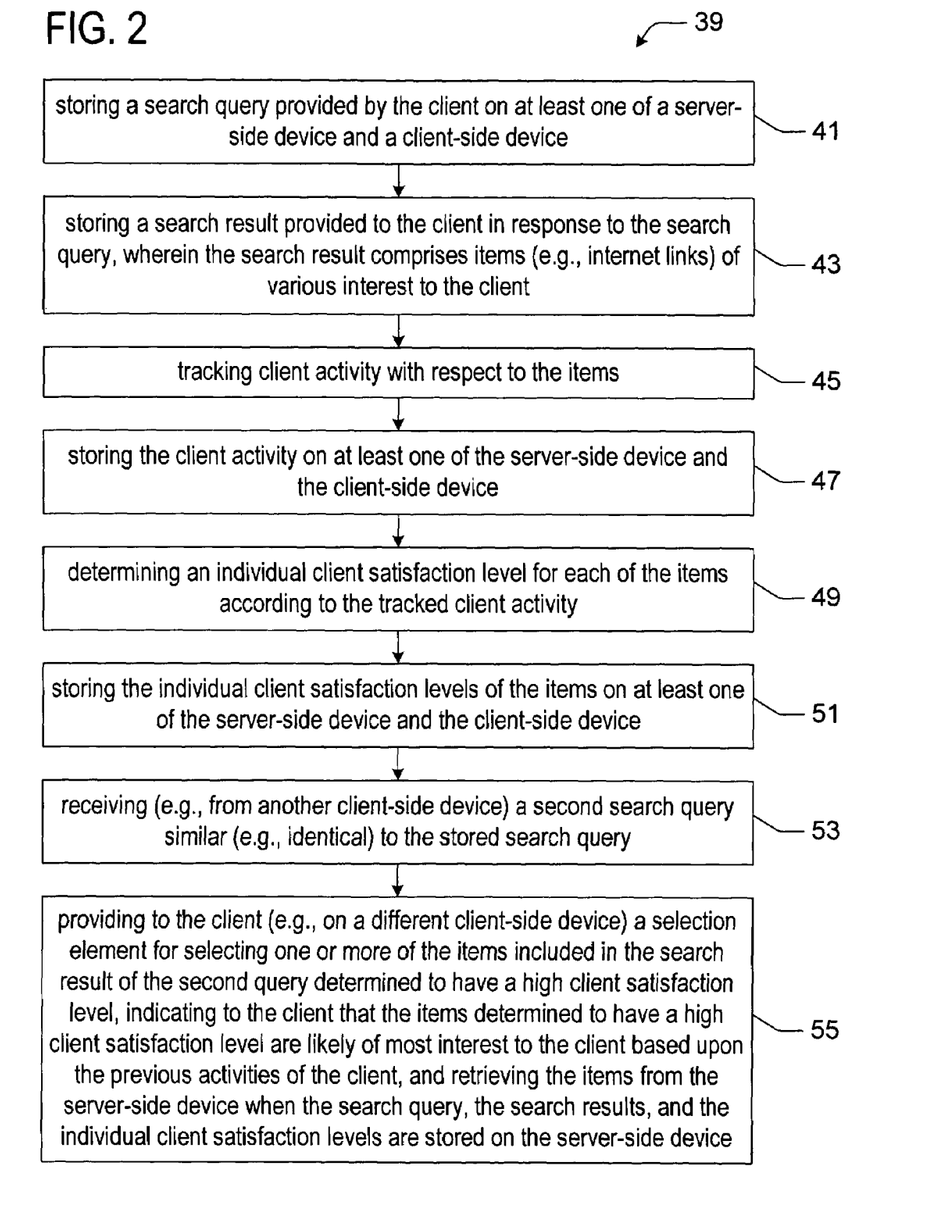
FIG. 2 is a flowchart of an exemplary method of the present invention.

Turning now to FIG. 2, a flowchart of a method of the present invention is generally depicted at 39. The disclosed method 39 is adapted to automatically prioritize search results provided to a client by a search engine according to client satisfaction with previous search results provided to the client. The method 39 comprises storing, at 41, a search query provided by the client on at least one of a server-side device (e.g., server 29) and a client-side device 23. The method 39 further comprises storing, at 43, a search result provided to the client in response to the search query on at least one of the server-side device and the client-side device. As will be discussed in greater detail below, storing the search results on the client-side device may provide some benefits, including enhanced information privacy (perceived or actual) for the client, utilization of client resources for storage, ease of access to stored data, among others. On the other hand, storing the search results on the server-side device may provide some benefits, including access to stored data on any client-side device (e.g., clients may enjoy the searching benefits from any device), utilization of non-client resources for storage, reliability of data storage and access, among others. In any event, the search result comprises items of various interest to the client. The items may be any number of things, although in one example the items of various interest to the client 23 are internet links (e.g., URLs (Uniform Resource Locators)). For example, a search engine, such as "msn Search" of Microsoft Corporation of Redmond, Wash., may provide a listing of internet links, or items, in response to a search query. The items may also include any number of other things, including media files (e.g., music files, video files, etc.), text files, data files, and photographs, among others.

The method further contemplates tracking, at 45, client activity with respect to the provided items (see FIG. 2). For example, the method may track which of the provided items the client selects, which of the provided items the client hovers over and for what duration, and the length of time spent reviewing each of the selected items, among others. Once tracked, the method may store, at 47, the client activity data on at least one of the server-side device 29 and the client-side device 23.

Based upon this stored client activity, the method may further determine, at 49, an individual client satisfaction level for each of the items according to the tracked client activity. As would be readily understood by one skilled in the art, the stored client activity may be utilized to infer the client's satisfaction with respect to particular items (see FIG. 2). Consider an example where a client receives a list of items and immediately selects the first item on the list, reviews the first item on the list for an extended period of time, and completes the search session by closing the session while reviewing the first item without selecting any other items from the list. One may readily infer from these actions, with some confidence, that the client was highly satisfied with this item selection. In another example, a client receives a list of items, selects several items only to return to the list to review more items, and finally enters a revised search query to obtain another list of items. One may readily infer from these actions, also with some confidence, that the client was unsatisfied with the items provided in the initial list. In other examples, of which not all will be set forth here, the tracked client activities utilized to determine an individual client satisfaction level with items returned in a search result may include at least one of (i) selecting or dwelling on an item, (ii) long-term viewing of an item, (iii) short-term viewing of an item, (iv) dwelling on a portion of an item, (v) dwelling on a specific portion of an item after reviewing the entire item, (vi) pausing after a period of activity, (vii) significant slowing of the rate of client interaction, (viii) immediate closure of an item after a brief glance, (ix) attempting to return to a prior state after an information access action, (x) undoing the effect of a recent action, (xi) issuing an undo command, (xii) deleting an item, and (xiii) considering the rate and frequency of client communications (e.g., e-mail messages, chatting, etc.), among others. Other client activities indicative of client satisfaction are also contemplated as within the scope of the present invention. For an additional example of such consideration of client activity as an indicator of satisfaction with search results, reference may be made to United States Patent Application No. 20040267730 A1, by Dumais et al., published Dec. 30, 2004, assigned to Microsoft Corporation of Redmond, Wash., entitled Systems and Methods for Performing Background Queries from Content and Activity. Many other client activity scenarios and corresponding inferred satisfaction levels may be envisioned, as would be readily understood by one skilled in the art and will not be set forth in more detail here. Once determined, these individual client satisfaction levels may be stored, at 51, on at least one of the server-side device 29 and the client-side device 23.

With this information stored, the client may go about utilizing his device 23 for other tasks, including sending different search queries to the server 29, without concerning himself with previous searches and the quality of the results received with such searches (see FIG. 2). If the client should issue a search query similar to a previous search query, the method may utilize the information stored in the database 33 to enhance the search results of the second query. In particular, the method further contemplates receiving, at 53, a second search query similar to the stored search query, wherein a search result of the second query includes at least some of said items. The method may use any number of methods to determine if the second search query is similar to one or more of the stored search queries (e.g., Boolean comparison, partial matching algorithm, etc.). One skilled in the art would readily contemplate how to determine the similarity of two search queries. Moreover, in one example, the second search query may be identical to the stored search query, thereby obviating the need for any such indirect comparison.

The method further contemplates providing, at 55, to the client a selection element for selecting one or more of the items included in the search result of the second query determined to have a high client satisfaction level. Rather than simply providing a listing of items deemed appropriate by the search algorithm, the present method goes further, utilizing the stored client satisfaction levels of items previously reviewed by the client to generate a more tailored list of items. The method enhances the placement of items determined to be highly satisfying to the client (e.g., placing such items at the top of the list) and deemphasizes the placement of items determined not to be highly satisfying to the client (e.g., placing such items at the bottom of the list).

In one example, the providing, at 55, one or more of the items comprises retrieving, also at 55, the items from the server-side device 29 when the search query, search results, and the individual client satisfaction levels are stored on the server-side device (see FIG. 2). Moreover, to facilitate a client's utilization of the stored information on any number of client-side devices 23, in still another example, the receiving, at 53, a second search query comprises receiving the second search query from another client-side device and the providing, at 55, one or more of the items comprises providing the items on the another client-side device. Because the data is stored on the server-side database 33, rather than one or more of the client-side devices 23, a client may search on any number of different client-side devices, yet still benefit from the stored information. For example, the server 29 may store the search query, the search result, and the individual client satisfaction levels on the database 33 based upon initial client searching on a desktop computer 23A (e.g., Client-side Device A). If the same client then submits a similar search query to the server 29 from a laptop computer 23B (e.g., Client-side Device B), the server may access the database 33 to modify the provided search results on the laptop computer based upon the individual client satisfaction levels first determined based upon the desktop computer. Utilizing such an arrangement may require the client to authenticate and logon to the server 29 or meet some authentification criteria (e.g., a cookie) for searches on additional client-side devices 23 before accessing the information in the database 33 to ensure the privacy of information stored in the database.

In another example, the providing, at 55, a selection element for selecting one or more of the items further comprises indicating, also at 55, to the client that the items determined to have a high client satisfaction level are likely of most interest to the client based upon the previous activities of the client. These indications are discussed in more detail below with respect to the user interfaces of the present invention.

User Interfaces

Figure 3:
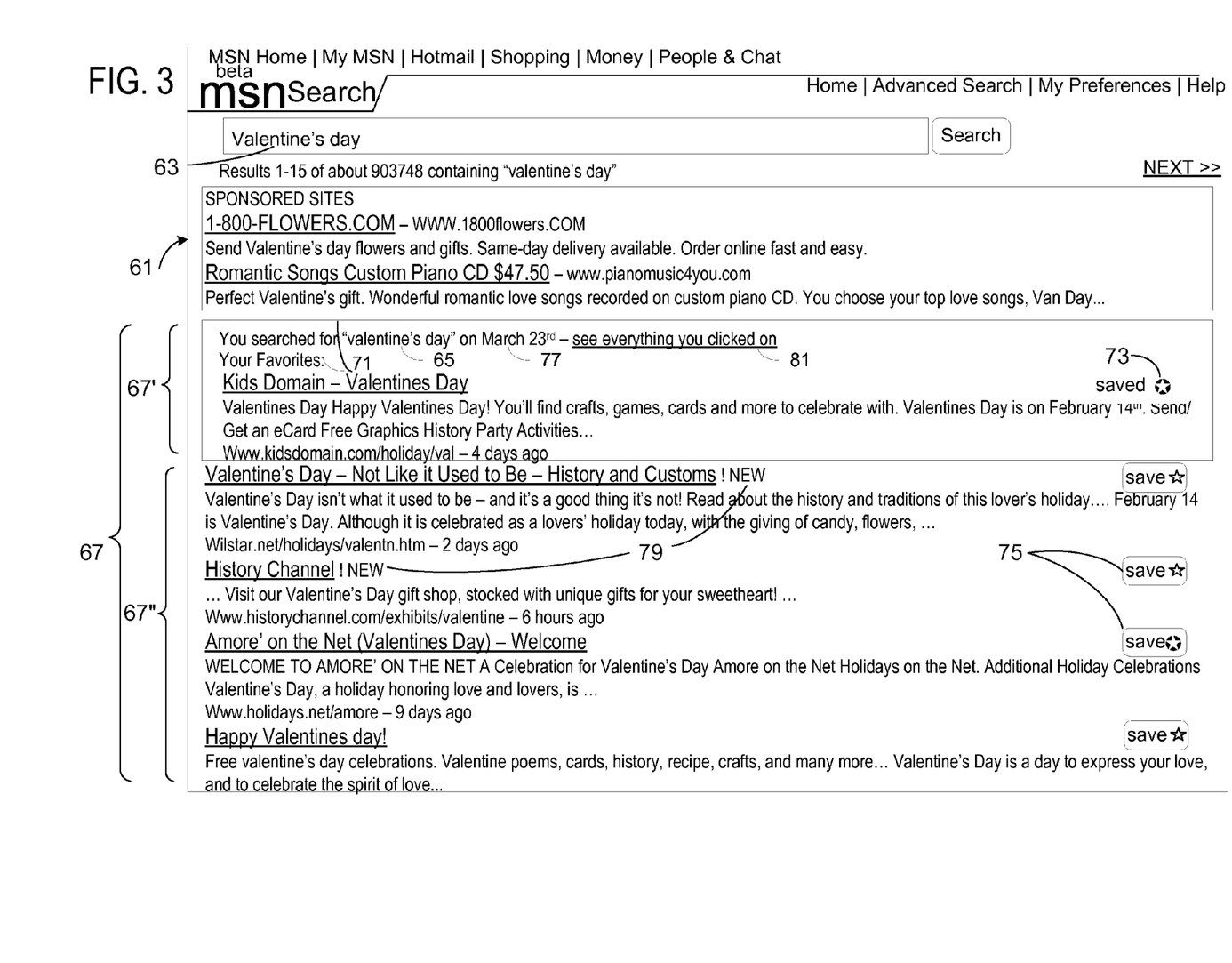
FIGS. 3 and 4 are screenshots of an exemplary user interface of the present invention.
Figure 4:
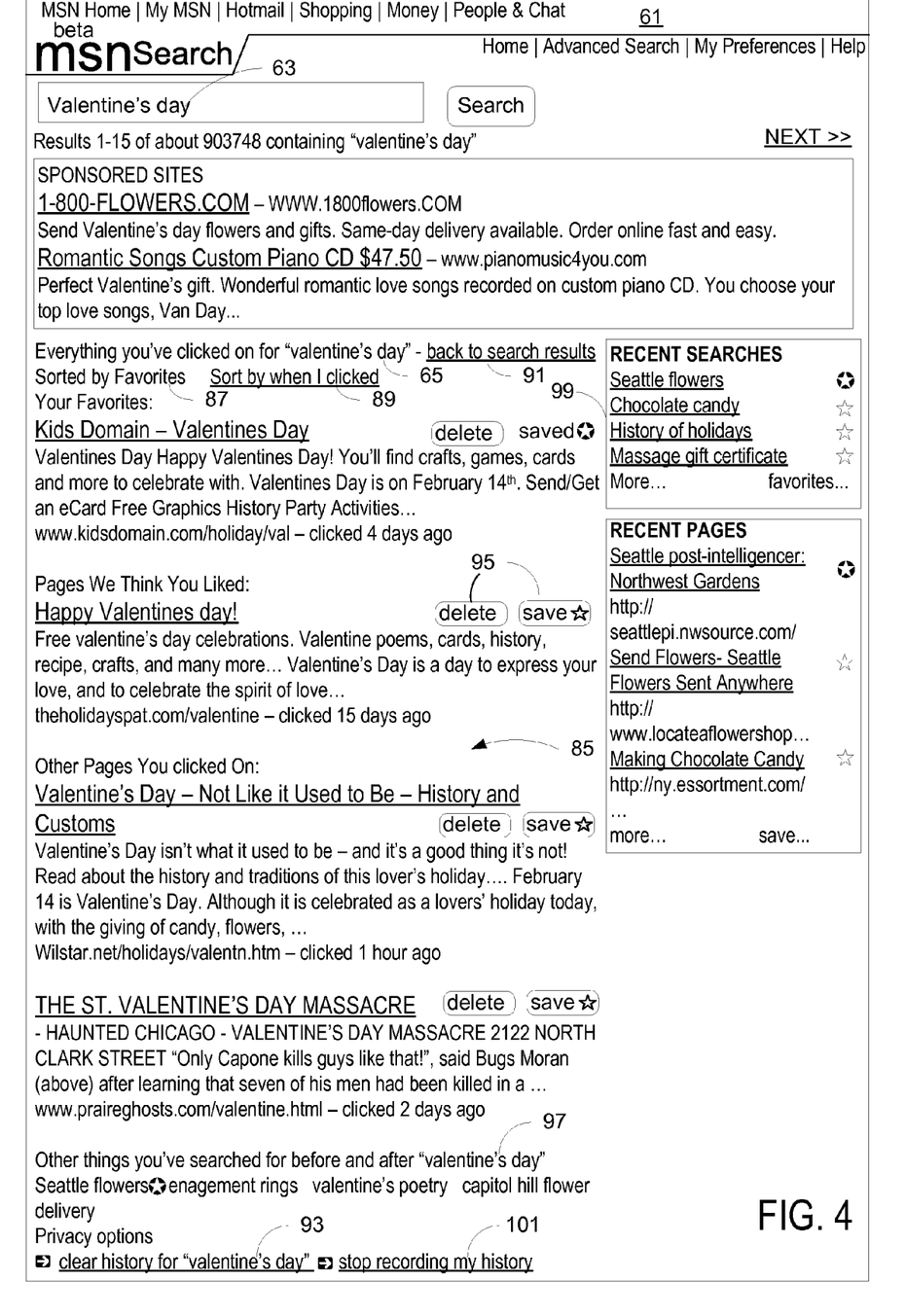

In another embodiment of the invention depicted in FIGS. 3 and 4, an exemplary user interface, generally indicated 61, is depicted for automatically providing prioritized search results to a client according to the client satisfaction level of the search results of a previous search conducted by the client that is similar to a current search. Such a user interface 61 may be utilized with the system 21 and/or the method described above. In such an example, the user interface 61 comprises a query display 63 of the current search query submitted by the client and a query display 65 of the similar previous search query submitted by the client.

In addition, the user interface 61 may include an item display 67 of at least one item 67' determined to have a high client satisfaction level based upon client activity with respect to search result items provided in the previous search (see FIG. 3). In other words, in FIG. 3, the link "Kids Domain—Valentines Day" is included in the portion of the item display 67' for items determined to have a high client satisfaction level. In addition, the item display 67 may also include at least one item 67" not determined to have a high client satisfaction level based upon client activity with respect to the items provided in the previous search. In other words, in FIG. 3, four other links are included in the portion of the item display 67" for items determined to have a low client satisfaction level. Note that the items determined to have a high client satisfaction level are located at the top of the item display 67, while those items determined to have a low client satisfaction level are located below. This visual prioritization of the items facilitates the usefulness of the search results, thereby bringing the most important items to the top of the item display 67, where the client is more likely to recognize them quickly.

The user interface 61 may also include an indicator element 71 indicating that the at least one item determined to have a high client satisfaction level has been determined to have a high client satisfaction level to the client (see FIG. 3). In the example of FIG. 3, two exemplary indicator elements 71 are shown, namely a border surrounding the item determined to have a high client satisfaction level and a notation of "Your Favorites:" directly above the item determined to have a high client satisfaction level. These indicator elements 71 further draw the client's attention to the prioritized items in the item display 67. Other indicator elements are also contemplated as within the scope of the present invention.

In still another example depicted in FIG. 3, the user interface 61 may include a graphic 73 indicating that the at least one item determined to have a high client satisfaction level 67' is saved as a favorite item of the client. This graphic 73 further reinforces the likely high client satisfaction associated with this item by reminding the client that this item is a favorite of the client. In addition, this graphic 73 reminds the client that this item is already a favorite and it need not be saved again as such.

In another example, the user interface 61 may further comprise a selection element 75 associated with each displayed item for saving the item as a favorite item of the client (see FIG. 3). This selection element 75 provides the client with an easy method for flagging important items as favorites. In still another example, the user interface 61 may further comprise a display 77 of the date of the previous search by the client. With this date display 77, the client can determine if the information provided is reliable. For example, a search conducted one week ago may be more pertinent than one conducted one year ago. In other cases, understanding the date of the search may be helpful to the client in determining whether or not the current search query matches a desired previous search.

In yet another example depicted in FIG. 3, the user interface 61 may further comprise a graphic 79 associated with one or more of the at least one item not determined to have a high client satisfaction level to indicate that the item is new when the item was not provided in the previous search. This graphic 79 alerts the client that this item, although grouped with those items 67" of low client satisfaction, may provide high client satisfaction because the item has not yet been reviewed by the client.

Referring now to FIGS. 3 and 4, in yet another example the user interface 61 may further comprise a selection element 81 (see FIG. 3) for presenting each of the items selected by the client during the previous search. By selecting the selection element 81 for presenting each of the items selected by the client during the previous search, the user interface 61 presents a second item display, generally indicated 85, including those items selected by the client in the previous search (see FIG. 4). This provides the client with an opportunity to view only those items deemed important enough to select for review by the client in the previous search. In effect, then, this selection element 81 provides the client with a second item display 85 that is likely to be filled with items of particular interest to the client, at least with respect to the unselected items not made part of the second item display. The user interface 61 including the second item display 85 may further comprise a selection element 87 for sorting the second item display according to the determined client satisfaction level of each item. In another example, the user interface 61 may further include a selection element 89 for sorting the second item display 85 according to the order in which the items were originally selected by the client in the previous search. These selection elements 87,89 provide the client with the ability to tailor the ordering of items in the second item display 85 for ease in review of items.

In another example, the user interface 61 including the second item display 85 may further include a selection element 91 (see FIG. 4) for returning to the item display 67 (see FIG. 3) of the at least one item determined to have a high client satisfaction level 67' and of the at least one item not determined to have a high client satisfaction level 67" based upon client activity with respect to the items provided in the previous search. The client may, therefore, toggle between the item display 67 and the second item display 85 with the selection elements 81,91

In still another example depicted in FIG. 4, the user interface 61 may further comprise a selection element 93 for clearing any stored information related to the current search query 63 and presenting the results of the current search without the prioritization based upon the previous search by the client. In yet another example, the user interface 61 including the second item display 85 may further comprise a selection element 95 associated with each displayed item for saving the item as a favorite item of the client and a selection element (also indicated 95) associated with each displayed item for deleting the item from the second item display.

In still another example, the user interface 61 further comprises a listing of search queries 97 searched nearly before or nearly after the submission of the previous search query (see FIG. 4). This listing of search queries 97 may be utilized by the client as a resource for additional potential search queries. Rather than requiring the client to recreate several alternate queries, the listing of search queries 97 provides a useful reference for the client if additional queries are required. In particular, by including those queries previously utilized at about the same time as the current search query, any searching strategies previously employed that performed better than the present query will be readily apparent to the client. In another example, the user interface 61 may further comprise a listing of recent search queries 99 submitted by the client. This listing of queries 99 may also facilitate the client in identifying those previous search strategies that performed better than the present query. In yet another example, the user interface 61 may further comprise a selection element 101 for terminating any future storage of client search activity. This selection element 101 is useful for a client who wishes to not rely on his own previous client activity or who wishes to share no information relating to his searching.

General Purpose Computing Device

Figure 5:
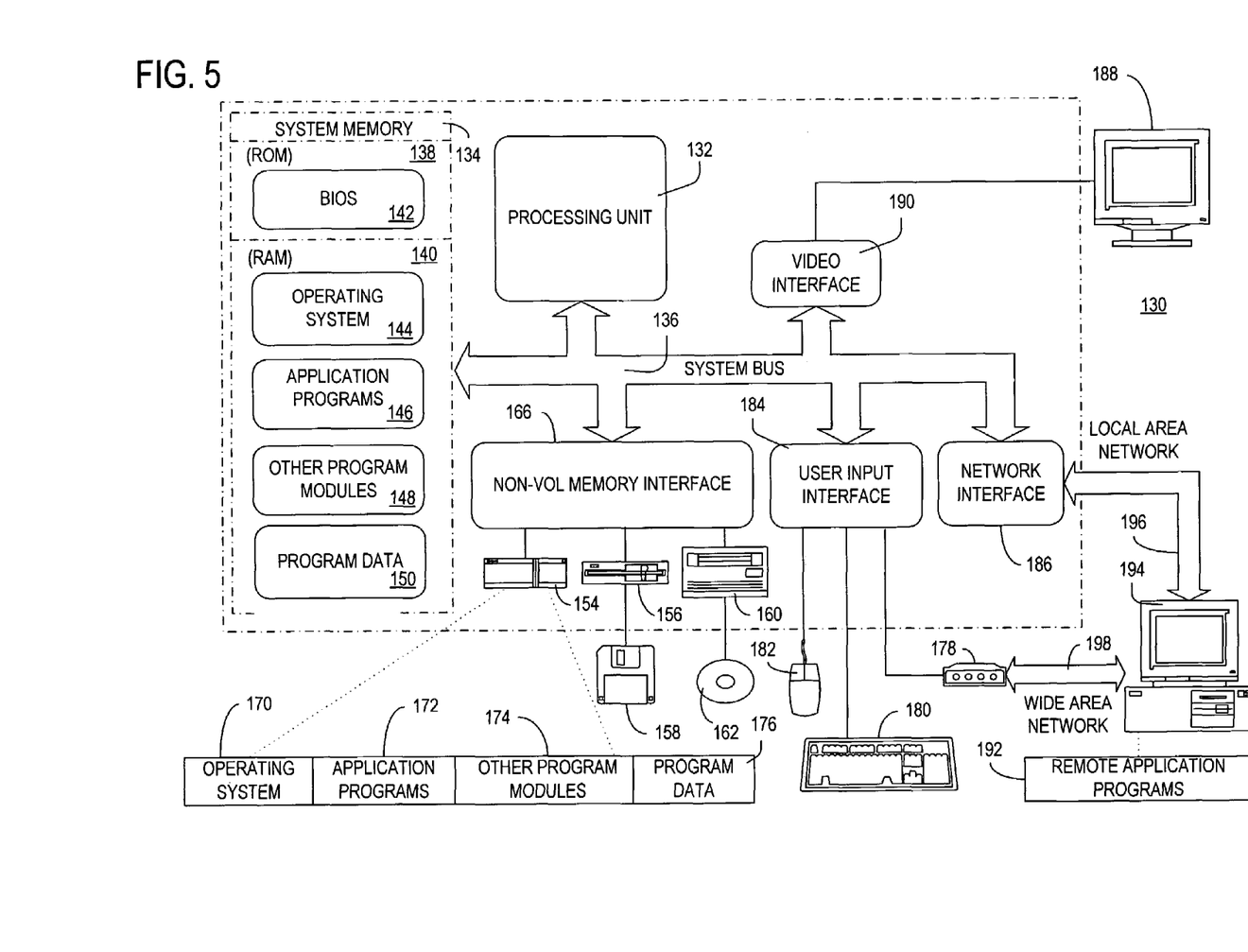
FIG. 5 is a block diagram illustrating one example of a suitable computing system environment in which the invention may be implemented.

FIG. 5 shows one example of a general purpose computing device in the form of a computer 130. In one embodiment of the invention, a computer such as the computer 130 is suitable for use in the other figures illustrated and described herein. In one example, the client computer or device discussed above may be embodied by computer 130. Computer 130 additionally has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. In one example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read-only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 5 illustrates operating system 144, application programs 146, other program modules 148, and program data 150.

The computer 130 may also include other removable/non-removable, volatile/nonvolatile computer storage media. In one example, FIG. 5 illustrates a hard disk drive 154 that reads from or writes to non-removable, nonvolatile magnetic media. FIG. 5 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 5, provide storage of computer readable instructions, data structures, program modules and other data for the computer 130. In FIG. 5, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A client may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, camera, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 5 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 5 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, in one example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the operations described below in conjunction with a microprocessor or other data processor.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A method for prioritizing search results provided to a client by a search engine according to client satisfaction with previous search results provided to the client, said method comprising:

storing a first search query in a first search session provided by the client on at least one of a server-side device and a client-side device, said first search session being defined by the first search query;

storing a list of other search queries from the client executed nearly before or nearly after the first search query;

storing a first search result provided to the client in response to the first search query on at least one of the server-side device and the client-side device, wherein first search result comprises first items of various interest to the client;

tracking client activity with respect to said first items in the first search result within the first search session;

storing said client activity on at least one of the server-side device and the client-side device;

determining an individual client satisfaction level for each of said first items according to said tracked client activity in the first search session, said individual client satisfaction level being associated with the client only;

storing said determined individual client satisfaction levels of said items on at least one of the server-side device and the client-side device;

receiving a second search query defining a second search session from the client similar to said stored first search query of the first search session by the client;

storing a second search result including second items of said second query, wherein the second items including at least some of said first items from the first search result in the first search session;

providing to said client only a selection element for selecting one or more of items included in both the second search result of the second search query and the first search result of the first search query that are also determined to have a high client satisfaction level based on the determining step; and providing the list of other search queries as a resource for additional potential search queries in response to providing the selection element in the second search session.

2. The method of claim 1 wherein said providing further comprises indicating to the client that the items determined to have a high client satisfaction level are likely of most interest to the client based upon the previous activities of the client, wherein said previous client activities may include at least one of (i) selecting or dwelling on an item, (ii) long-term viewing of an item, (iii) short-term viewing of an item, (iv) dwelling on a portion of an item, (v) dwelling on a specific portion of an item after moving through the item, (vi) pausing after a period of activity, (vii) significant slowing of the rate of client interaction, (viii) immediate closure of an item after a brief glance, (ix) attempting to return to a prior state after an information access action, (x) undoing the effect of a recent action, (xi) issuing an undo command, (xii) deleting an item, and (xiii) considering the rate and frequency of client communications.

3. The method of claim 1 wherein said providing one or more of said items comprises retrieving said items from said server-side device when said search query, said search results, and said individual client satisfaction levels are stored on the server-side device.

4. The method of claim 3 wherein said receiving a second search query comprises receiving said second search query from another client-side device and said providing one or more of said items comprises providing said items on said another client-side device.

5. The method of claim 1 wherein said storing a search result of items comprises storing a search result of internet links.

6. The method of claim 1 wherein said receiving a second search query comprises receiving a second search query identical to said search query.

7. A user interface for providing prioritized search results to a client according to the client satisfaction level of the search results of a previous search conducted by the client similar to a current search, said user interface comprising:
   a query display of the previous search query in a first search session by the client;
   a query display of the current search query in a second search session by the client;
   an item display of the at least one item determined to have a high client satisfaction level based upon client activity with respect to search result items provided in the first search in the first search session and at least one item not determined to have a high client satisfaction level based upon client activity with respect to the items provided in the first search;
   an indicator element indicating that the at least one item determined to have a high client satisfaction level has been determined to have a high client satisfaction level to the client; and
   a list of potential alternate queries identifying search queries searched nearly before or nearly after submission of the first search query.

8. The user interface of claim 7 farther comprising a graphic indicating that the at least one item determined to have a high client satisfaction level is saved as a favorite item of the client.

9. The user interface of claim 7 further comprising a selection element for presenting each of the items selected by the client during the previous search, wherein selection of said selection element for presenting each of the items selected by the client during the previous search presents a second item display including those items selected by the client in the previous search.

10. The user interface of claim 9 further comprising a selection element for sorting the second item display according to the determined client satisfaction level of each item, and
   a selection element for sorting the second item display according to the order in which the items were originally selected by the client.

11. The user interface of claim 9 wherein said second item display includes a selection element for returning to the item display of at least one item determined to have a high client satisfaction level and of at least one item not determined to have a high client satisfaction level based upon client activity with respect to the items provided in the previous search.

12. The user interface of claim 9 further comprising a selection element associated with each displayed item for saving the item as a favorite item of the client, and a selection element associated with each displayed item for deleting the item from the second item display.

13. The user interface of claim 7 further comprising a selection element for clearing any stored information related to the current search query and presenting the results of the current search without the prioritization based upon the previous search by the client.

14. The user interface of claim 7 further comprising a selection element associated with each displayed item for saving the item as a favorite item of the client.

15. The user interface of claim 7 further comprising a display of the date of the previous search by the client.

16. The user interface of claim 7 further comprising a graphic associated with one or more of said at least one item not determined to have a high client satisfaction level to indicate that the item is new when said item was not provided in the previous search.

17. The user interface of claim 7 further comprising a listing of search queries searched nearly before or nearly after the submission of the previous search query.

18. The user interface of claim 7 further comprising a selection element for terminating any future storage of client search activity.

19. The user interface of claim 7 further comprising a listing of recent search queries submitted by the client.

20. A system for prioritizing search results provided to a client by a search engine via a network according to client satisfaction with previous search results provided to he client, said system comprising:
   a server adapted for connection with said network, said server adapted for receiving a first search query in a first search session from a client accessing the network with a client-side device, said first search session being define by the first search query
   a database adapted for connection with the server for storing the received first search query provided by the client and for storing a first search result provided to the client by the server in response to the search query, wherein said first search result comprises items of various interest to the client, wherein the database stores a list of other search queries from the client executed nearly before or nearly after the first search query, wherein said server is further configured to:
   track client activity with respect to said first items in the first search result within the first search session;
   store said client activity on said database;
   determine an individual client satisfaction level for each of said first items according to said tracked client activity in the first search session, said individual client satisfaction level being associated with the client only;

store said individual client satisfaction levels of said items on said database;

receive a second search query defining a second search session from the client similar to said stored first search query of the first search session by the client;

store a second search result including at least some of said items from the first search session;

provide to said client only a selection element for selecting one or more of items included in both the second search result of the second search query and the first search result of the first search query that are also determined to have a high client satisfaction level based on the determining step; and providing the list of other search queries as a resource for additional potential search queries in response to providing the selection element in the second search session.

* * * * *